US007254653B2

(12) United States Patent
Tsai et al.

(10) Patent No.: US 7,254,653 B2
(45) Date of Patent: Aug. 7, 2007

(54) SWITCH CONTROL SYSTEM AND METHOD THAT DISTINGUISHES BETWEEN A PLURALITY OF REAL AND EMULATED INPUT DEVICES

(75) Inventors: Chih-Ming Tsai, Taipei Hsien (TW); Chao-Ren Cheng, Taipei Hsien (TW)

(73) Assignee: ICP Electronics Inc., Shi-Chih, Taipei Hsien (TW)

( * ) Notice: Subject to any disclaimer, the term of this patent is extended or adjusted under 35 U.S.C. 154(b) by 403 days.

(21) Appl. No.: 10/711,000

(22) Filed: Aug. 17, 2004

(65) Prior Publication Data

US 2005/0144329 A1    Jun. 30, 2005

(30) Foreign Application Priority Data

Dec. 30, 2003   (TW) .............................. 92137363 A

(51) Int. Cl.
*G06F 3/00*       (2006.01)
*G06F 5/00*       (2006.01)

(52) U.S. Cl. .............................. 710/38; 710/51; 710/73

(58) Field of Classification Search .................. 710/20, 710/21, 31, 67, 8, 33, 73, 38, 51
See application file for complete search history.

(56) References Cited

U.S. PATENT DOCUMENTS 5,991,830 A * 11/1999 Beard et al. ................... 710/18
6,671,756 B1 * 12/2003 Thomas et al. ................ 710/73

\* cited by examiner

*Primary Examiner*—Kim Huynh
*Assistant Examiner*—Jonathan R. Plante
(74) *Attorney, Agent, or Firm*—Winston Hsu

(57) ABSTRACT

A switch control system has a switch device for selecting a real input device or an emulation input device, an instruction detecting device electrically connected to a computer system and the switch device for detecting signals transmitted to the switch device, and a control device electrically connected to the switch device and the instruction detecting device for receiving a detecting signal from the instruction detecting device and for outputting a control signal to trigger the switch device and to control the selection of the switch device.

8 Claims, 4 Drawing Sheets

SWITCH CONTROL SYSTEM AND METHOD THAT DISTINGUISHES BETWEEN A PLURALITY OF REAL AND EMULATED INPUT DEVICES

BACKGROUND OF INVENTION

1. Field of the Invention

The present invention relates to a switch control system and related switch control method for a computer system and a plurality of input devices.

2. Description of the Prior Art

Due to the explosive development of information technologies, computer systems are in wide use. For example, a server of an industrial computer is usually connected with a plurality of monitors, keyboards and mice and is capable of controlling the operation of a personal computer connected to it. In addition to a keyboard/mouse set installed on a local port, a server has to connect with extra keyboard/mouse sets via a communications network, so that any user can input data to the computer by any of the keyboard/mouse sets.

Please refer to FIG. 1, which is a block diagram of a switch control system for a plurality of keyboard/mouse sets according to the prior art. The switch control system comprises a server 100, a real keyboard/mouse set 104, an emulation keyboard/mouse set 106, and a switch device 102 (connected to the server 100, the real keyboard/mouse set 104 and the emulation keyboard/mouse set 106). The switch is manually switched to connect the server 100 to the real keyboard/mouse set 104 or to the emulation keyboard/mouse set 106.

However, the manual switching mechanism between the real keyboard/mouse set 104 and the emulation keyboard/mouse set 106 is inconvenient. Moreover, since the real keyboard/mouse set 104 and the emulation keyboard/mouse set 106 usually transmit data by making use of a PS/2 interface, a bi-directional transmission interface. The server 100 does not stop transmitting a control signal to the real keyboard/mouse set 104 while the switch device 102 is switched to connect the server 100 with the emulation keyboard/mouse set 106. A signal collision problem resulting from a real signal from the real keyboard/mouse set 104 colliding with an emulated signal from the emulation keyboard/mouse set 106 becomes inevitable.

In result, to improve the quality of data transmitted between a computer and a keyboard/mouse set and to ensure that data transmitted to or received from the real keyboard/mouse set 104 and the emulation keyboard/mouse set 106 are correct are becoming important issues in the art.

SUMMARY OF INVENTION

It is therefore a primary objective of the claimed invention to provide a switch control system and a related switch control method for a computer system and a plurality of input devices, so as to reduce the signal collision problem by the use of a switch device to connect selectively the computer system to a real input device or to an emulation input device.

It is another objective of the claimed invention to provide a switch control system and a related switch control method for controlling a computer to transmit/receive real signals of a real input device, or to transmit/receive emulated signals of an emulation input device by the use of triggering a plurality of input devices.

According to the above objectives, the present invention provides a switch control system including a switch device, an instruction detecting device, and a control device for controlling a switching mechanism of a plurality of input devices comprising a real input device and an emulation input device.

In operation, the switch device is switched according to a clock/data transmitted from the computer system to transmit the clock/data signal via the communication interface to the real input device or to the emulation input device. Thus, the clock/data signal is isolated from being transmitted between the real input device and the emulation input device.

The instruction detecting device coupled to the computer system and the switch device detects the clock/data signal transmitted from the computer system to the switch device. The instruction detecting device outputs a first detecting signal when a first acknowledge signal of the real input device responsive to the computer system is detected. The instruction detecting device outputs a second detecting signal $D_2$ instead of the first detecting signal when a second acknowledge signal of the emulation input device responsive to the computer system is detected. The first detecting signal and the second detecting signal serve to determine the clock/data signals' transmission between the switch and the computer system.

The control device coupled to the switch device and the instruction detecting device is used to receive the first detecting signal and the second detecting signal and outputs a control signal to trigger the switch device.

For example, the instruction detecting device outputs a control signal to trigger the switch device to connect the computer system to the emulation input device while receiving the first detecting signal. On the contrary, the instruction detecting device outputs a control signal to trigger the switch device to connect the computer system to the real input device while receiving the second detecting signal.

In operation, the switch control system is initialized and the computer system is capable of communicating via a communication interface with the real input device or with the emulation input device. Then, the switch device receives or transmits clock/data signals via the communication interface. The switch device is switched to connect the computer system with the real input device and the real input device is capable of receiving clock/data signals transmitted from the computer system only, therefore isolating clock/data signal transmission between the real input device and the emulation input device.

The instruction detecting device detects clock/data signal transmission between the computer system and the switch device. Specifically, the real input device outputs the first detecting signal while a first acknowledge signal of the real input device responsive to the computer system is detected. The real input device also outputs the second detecting signal instead of the first detecting signal while a second acknowledge signal of the emulation input device responsive to the computer system is detected. As a result, the transmission status between the computer system and the switch device is monitored by the instruction detecting device all the time.

Lastly, a first control signal for switching the switch device to connect the computer system with the real input device is output to respond to the first detecting signal, while a second control signal for switching the switch device to connect the computer system with the emulation input device is output to respond to the second detecting signal.

In summary, the present invention makes use of a switch control system and related method comprising a plurality of input devices. The switch control system enables the computer system to communicate asynchronously with the real input device or with the emulation input device and to solve a signal collision problem between a real signal and an emulation signal.

In the process of data transmission, a plurality of switches control the real input device at any time according to the control signal, thus preventing unexpected abnormal signals and solving the signal collision problem resulting from bi-directionally transmitted data.

These and other objectives of the claimed invention will no doubt become obvious to those of ordinary skill in the art after reading the following detailed description of the preferred embodiment that is illustrated in the various figures and drawings.

DETAILED DESCRIPTION

The present invention discloses a switch control system and a related method for a plurality of input devices. A switch device is controlled to manage data transmission between a computer system and a real input device or an emulation input device, solving the signal collision problem resulting from the real signals colliding with the emulated signals. The switch device is switched to transfer real signals between the computer system and the real input device or to transfer emulated signals between the computer system and the emulation input device by the use of triggering a plurality of switches.

Figure 1:
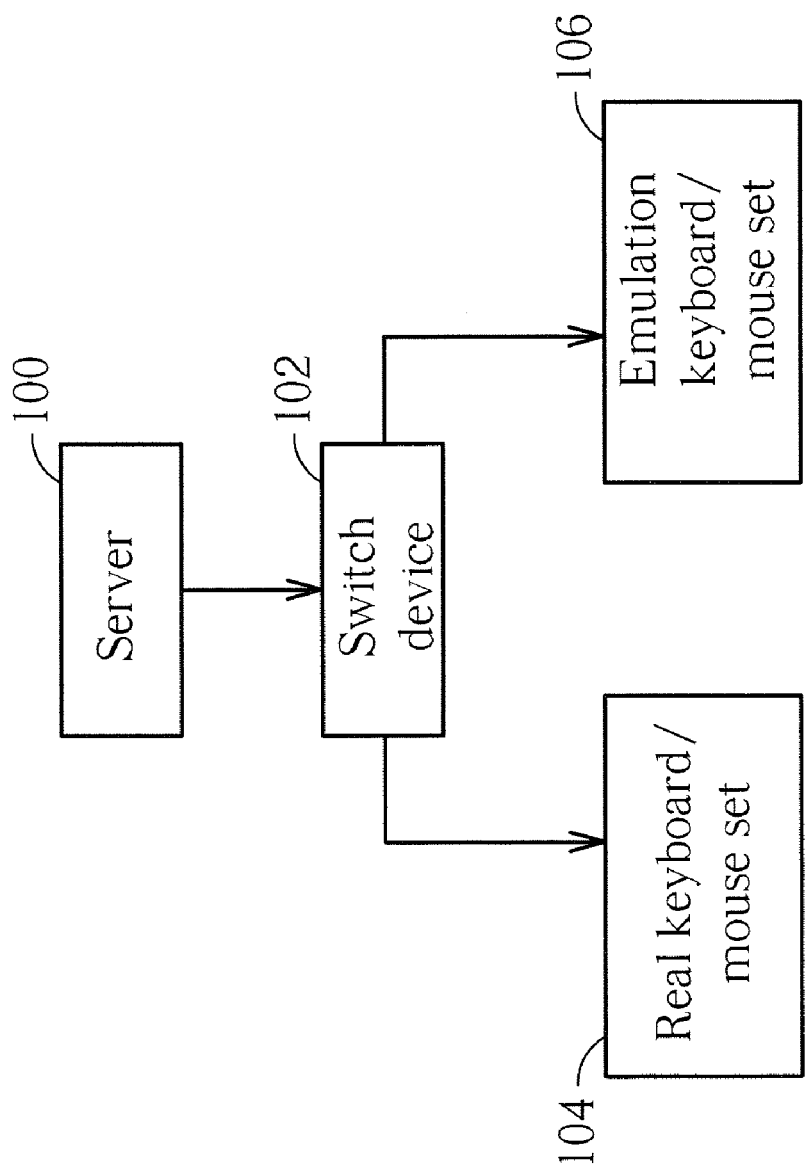
FIG. 1 is a block diagram of a switch control system including a plurality of keyboard/mouse sets according to the prior art.
Figure 2:
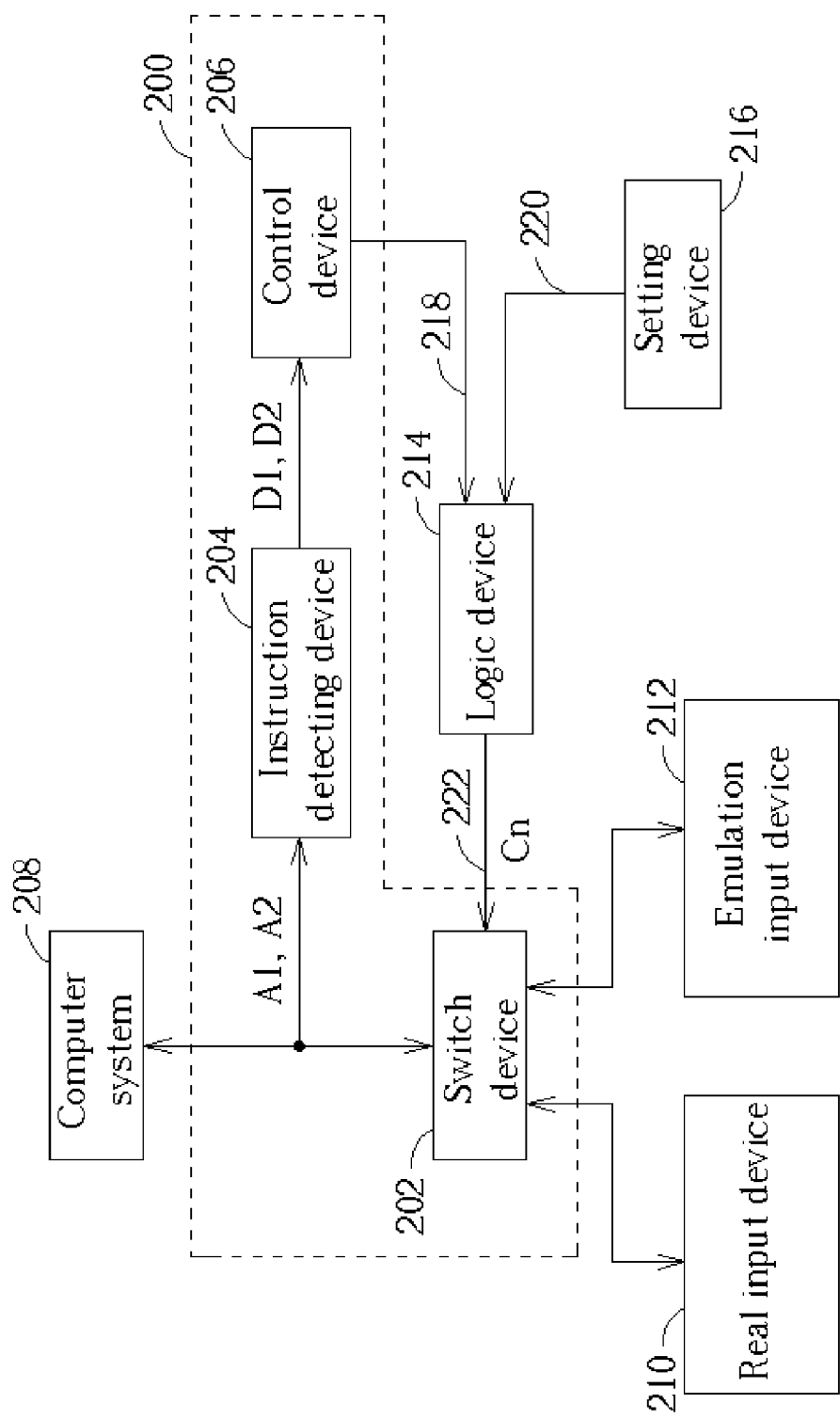
FIG. 2 is a block diagram of a switch control system for a plurality of input devices according to the present invention.

Please refer to FIG. 2, which is a block diagram of a switch control system 200 and a plurality of input devices of the preferred embodiment according to the present invention. The switch control system 200 comprises a switch device 202, an instruction detecting device 204, and a control device 206 for controlling a computer system 208 to communicate with a real input device 210 or with an emulation input device 212. According to the preferred embodiment of the present invention, the real input device 210 can be a mouse, a keyboard or a combination of both. The emulation input device 212 can be a mouse, a keyboard or a combination of both, all of which are electrically connected to the computer system 208 via a communications network, such as a bus, a wire/wireless local area network (LAN) and a wide area network (WAN). The mouse and the keyboard mentioned above can have, for example, the PS/2 communication interface as a communication interface to transfer data. Therefore, the computer system 208 is capable of transmitting or receiving signals to/from the real input device 210 or one or more than one emulation input device 212 via the PS/2 communication interface.

In operation, the switch device 202 is switched by a clock/data from the computer system 208 to transmit the clock/data signal to the real input device 210 or to the emulation input device 212 via the communication interface.

The signal collisions between the real input device 210 and the emulation input device 212 are isolated by the switch device 202.

The instruction detecting device 204 is coupled to the computer system 208 and the switch device 202 for detecting the clock/data signal transmitted from the computer system 208 to the switch device 202. The instruction detecting device 204 outputs a first detecting signal $D_1$ when a first acknowledge signal A of the real input device 210 responsive to the computer system 208 is detected. The instruction detecting device 204 outputs a second detecting signal $D_2$ instead of the first detecting signal D when a second acknowledge signal $A_2$ of the emulation input device 212 responsive to the computer system 208 is detected. The first detecting signal $D_1$ and the second detecting signal $D_2$ serve to determine the clock/data signals' transmission between the switch 202 and the computer system 208.

The control device 206 coupled to the switch device 202 and the instruction detecting device 204 is used to receive the first detecting signal $D_1$ and the second detecting signal $D_2$ and outputs a control signal Cn to trigger the switch device 202. For example, the instruction detecting device 204 outputs a control signal Cn to trigger the switch device 202 to connect the computer system 208 to the emulation input device 212 when receiving the first detecting signal $D_1$. On the contrary, the instruction detecting device 204 outputs a control signal Cn to trigger the switch device 202 to connect the computer system 208 to the real input device 210 when receiving the second detecting signal $D_2$.

Please note that the switch control system 200 of the present invention further comprises a logic device 214 and a setting device 216. The logic device 214 comprises a first input terminal 218 coupled to the control device 206 for receiving the control signal Cn, a second input terminal 220, and an output terminal 222 coupled to the switch device 202 for outputting the control signal Cn to the switch device 202. The setting device 216 coupled to the second input terminal 220 of the logic device 214 is used to set a plurality of operating modes of the logic device 214 and to trigger the switch device 202 with the control signal Cn. According to the preferred embodiment, the logic device 214 comprises an "AND" gate, an "OR" gate or a combination of other logic components.

Figure 3:
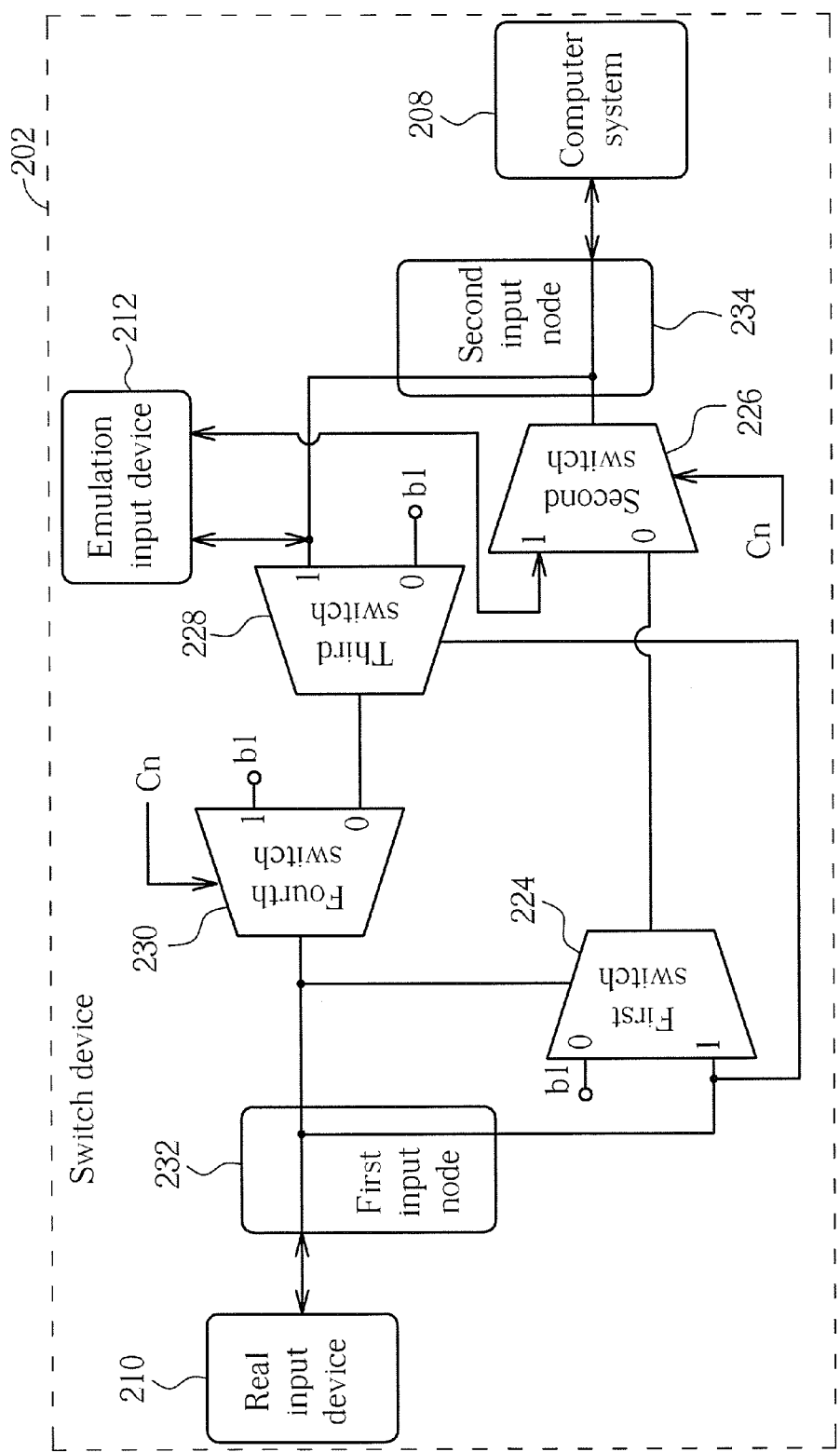
FIG. 3 is a block diagram of a switch device of the switch control system shown in FIG. 2 according to the present invention.

Please refer to FIG. 3, which is a block diagram of the switch device 202 of the switch control system 200 shown in FIG. 2 according to the present invention. A clock/data signal comprises a real clock/data signal and an emulation clock/data signal. The switch device 202 comprises a first switch 224, a second switch 226, a third switch 228 and a fourth switch 230. The first switch 224 is coupled to the real input device 210 for conducting the real clock/data signal. The second switch 226 is coupled to the first switch 224, the emulation input device 212, the control device 206 and the computer system, respectively, 208 for conducting and transmitting either the real clock/data signal or the emulation clock/data signal to the computer system 208 according to the control signal Cn. The third switch 228 is coupled to the computer system 208, the emulation input device 212 and the real input device 210 for conducting and transmitting the clock/data signal from the computer system 208 either to the real input device 210 or to the emulation input device 212 according to the control signal Cn. The fourth switch 230 coupled to the first switch 224, the third switch 228 and the real input device 210, respectively, for the emulation input device 212 to receive either the emulation clock/data signal from the computer system 208 or the real clock/data signal from the third switch 228 by disabling the first switch 224 according to the control signal Cn. In the preferred embodiment, a predetermined voltage level signal b1 is a high-level voltage or a low-level voltage can be provided to second inputs of the first, third, and fourth switches according to design considerations.

The switch device 202 further comprises a first input node 232 coupled to the real input device 210, the first switch 224 and the fourth switch 230 for receiving/transmitting the real clock/data signal; and a second input node 234 coupled to the computer system 208, the emulation input device 212, the second switch 226 and the third switch 228 for receiving/transmitting the clock/data signal of the computer system 208.

The switch device 202 further comprises a data-recording device (not shown) for recording the values of scan_code_set, which are necessary for software encoding. The switch device 202 is therefore capable of transmitting data of a specified format compatible with the computer system 208 while switching the computer system 208 not to connect with the real input device 210 but to connect with the emulation input device 212. The first, the second, the third and the fourth switches 224, 226, 228 and 230 can be multiplexers or electronic switches. In addition, each of the above switches can have a corresponding output terminal connected with a register (not shown) for receiving output signals of the corresponding switch as accurately as possible, so as to ensure that the clock/data signals are correct.

According to the above-mentioned paragraphs, if the external circuit connected to the input devices transmits data bi-directionally, for example by the PS/2 communication interface, the computer system 208 still has to output instructions to the real input device 210 when the switch device 202 is switched to connect the computer system 208 with the emulation input device 212. As a result, there is a need to redesign the switch device 202.

When the switch control system 200 is switched to connect the computer system 208 with the emulation input device 212, the switch device 202 is automatically switched to connect the computer system 208 with the real input device 210 instead of the emulation input device 212 if receiving the instructions from the computer system 208. The computer system 208 can then execute a setting operation on the real input device 210 directly, the instruction detecting device 204 informing the switch device 202 to connect the computer system 208 back with the emulation input device 212 by determining a response from the real input device 210.

In such a scenario as described above, the signal collision problem is therefore resolved and the computer system 208 can receive/transmit data correctly when the computer system 208 is receiving/transmitting data of the real input device 210 or the emulation input device 212.

Figure 4:
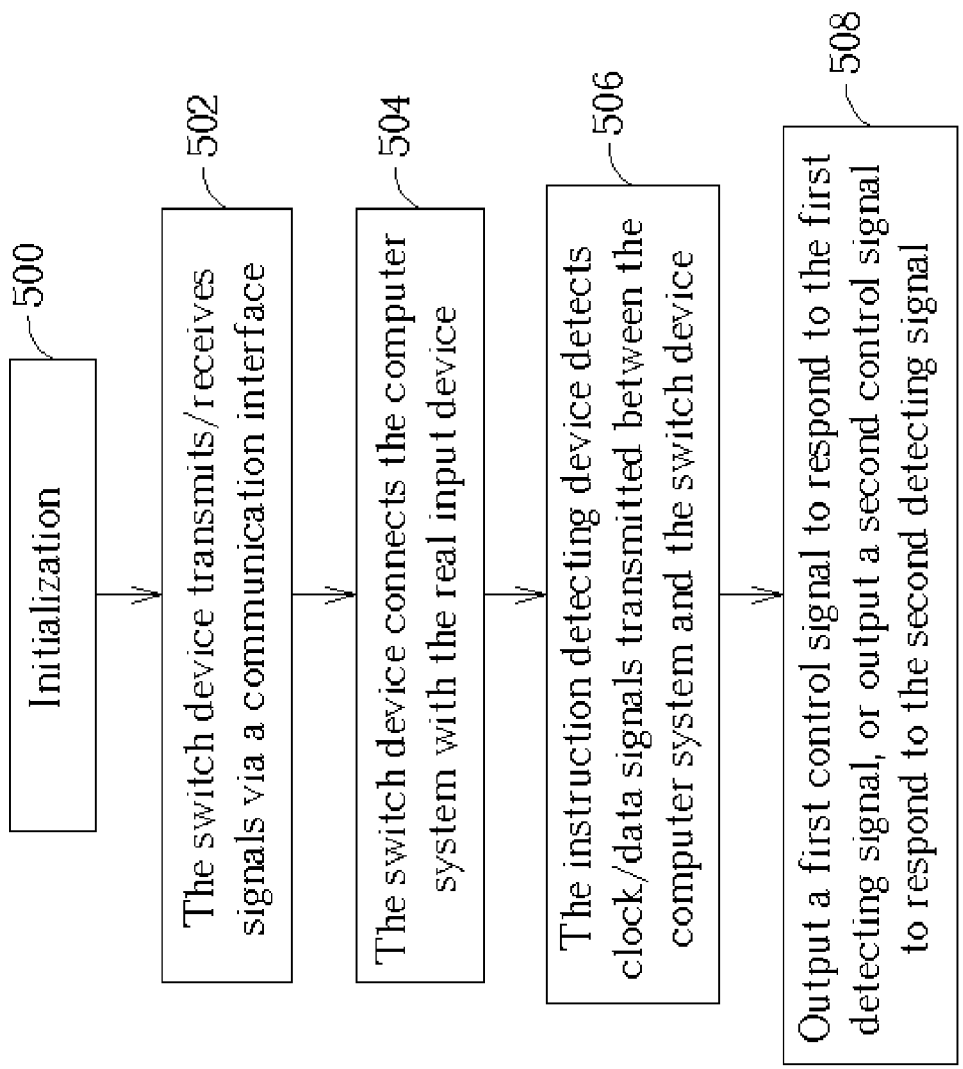
FIG. 4 is a flowchart of a switch control method for the switch control system shown in FIG. 2 according to the present invention.

Please refer to FIG. 4 in accordance with the block diagram of the switch control system 200 shown in FIG. 2 and the block diagram of the switch device 202 shown in FIG. 3. FIG. 4 is a flowchart of a switch control method for the switch control system 200 according to the present invention. In step 500, the switch control system 200 is initialized and the computer system 208 is capable of communicating via the PS/2 communication interface with the real input device 210 or with the emulation input device 212. Step 500 further sets a sampling frequency and the scan_code_set of the real input device 210 and the emulation input device 212. In addition, the setting device 216 of step 500 sets the logic device 214, which is capable of receiving and then outputting the control signal Cn for triggering the switch device 202.

In step 502, the switch device 202 is used to receive or transmit clock/data signals via the PS/2 communication interface. In step 504, the switch device 202 is switched to connect the computer system 208 with the real input device 210 and the real input device 210 is capable of receiving clock/data signals transmitted from the computer system 208 only. Thus the signal collisions between the real input device 210 and the emulation input device 212 is isolated by the switch device 202. In addition, the recording process of the scan_code_set has to be performed before step 504 in order that the clock/data signal transmission between the computer system 208 and the real input device 210 or the emulation input device 212 functions successfully.

In practice, step 504, the switch device 202 being switched to connect the computer system 208 to the real input device 210, further comprises outputting a first disabling signal to disable the third switch 228. In such a scenario, the clock/data signals can be transmitted from the real input device 210 to the computer system 208 through the first switch 224 and the second switch 226 sequentially. Step 504 further comprises outputting a second disabling signal to disable the first switch 224, so that the clock/data signals can be transmitted from the computer system 208 to the real input device 210 through the third switch 228 and the fourth switch 230 sequentially.

In step 506, the instruction detecting device 204 detects clock/data signal transmission between the computer system 208 and the real input device 210 by outputting the first detecting signal $D_1$ when a first acknowledge signal $A_1$ of the real input device 210 responsive to the computer system 208 is detected. Alternatively, the instruction detecting device 204 outputs the second detecting signal $D_2$ instead of the first detecting signal $D_1$ when a second acknowledge signal $A_2$ of the emulation input device 212 responsive to the computer system 208 is detected.

In step 508, a first control signal for switching the switch device to connect the computer system 208 with the real input device 210 is output to respond to the first detecting signal $D_1$. A second control signal for switching the switch device to connect the computer system 208 with the emulation input device 212 is output to respond to the second detecting signal $D_2$. In practice, signals of the setting device 216 are "AND" operated with the first detecting signal $D_1$ or the second detecting signals $D_2$ respectively to form a switching mechanism. In a mode that the computer system 208 is connected with the real input device 210, the switch device 202 isolates signals of the emulation input device 212 from entering to the real input device 210 and to the computer system 208 as well and protects the computer system 208 and the PS/2 communication interface from any latent abnormal signals.

Step 508 of the preferred embodiment further comprises transmitting the clock/data signals to the computer system 208 through the emulation input device 212 and the second switch 226 sequentially when the switch device 202 is switched to connect the computer system 208 with the emulation input device 212 and both of the first switch 224 and the fourth switch 230 are disabled according to the first control signal.

In addition, step 508 further comprises transmitting the clock/data signals from the computer system 208 via the third switch 228 to the emulation input device 212 when the switch device 202 is switched to connect the computer system 208 with the emulation input device 212 and both of the first switch 224 and the fourth switch 230 are disabled according to the first control signal.

In contrast to the prior art, the present invention provides a switch control system that can be switched to connect the computer system 208 with the real input device 210 or with the emulation input device 212. The computer system 208 is therefore capable of communicating with the real input device 210 or with the emulation input device 212 asynchronously, and the signal collision problem is resolved. Moreover, the switch device 202 comprises a plurality of switches for controlling the real input device 210 at any time according to the control signal Cn, protecting from unexpected abnormal signals and solving the signal collision problem resulting from bi-directionally transmitted data.

Following the detailed description of the present invention above, those skilled in the art will readily observe that numerous modifications and alterations of the device may be made while retaining the teachings of the invention. Accordingly, the above disclosure should be construed as limited only by the metes and bounds of the appended claims.

What is claimed is:

1. A switch control system for a plurality of input devices comprising a real input device and an emulation input device, the switch control system comprising:
    a switch device for selecting either of the two input devices, and then isolating signals of an unselected input device when a selected input device is transmitting or receiving signals, the switch device comprising:
        a first switch having a first input directly coupled to the real input device;
        a second switch having a first input directly coupled to an output of the first switch, a second input directly coupled to the emulation input device, an output for directly coupling to a computer, and a control input;
        a third switch having a first input for directly coupling to the computer and directly coupled to the emulation input device, and a control input directly coupled to the real input device; and
        a fourth switch having an output directly coupled to the real input device and to a control input of the first switch, a first input directly coupled to an output of the third switch, and a control input;
    an instruction detecting device electrically connected to the switch device for detecting signals transmitted to the switch device; and
    a control device electrically connected to the control input of the second switch, to the control input of the fourth switch, and to the instruction detecting device for receiving a detecting signal from the instruction detecting device and outputting a control signal to trigger the switch device and to control the selection of the switch device.

2. The switch control system of claim 1, wherein the four switches respectively comprise at least a multiplexer.

3. The switch control system of claim 1 further comprising:
    a logic device comprising a first input terminal coupled to the control device for receiving the control signals, a second input terminal, and an output terminal coupled to the switch device for outputting the control signal to the switch device; and
    a setting device coupled to the second input terminal of the logic device for setting operation modes of the logic device to trigger the switch device with the control signal.

4. The switch control system of claim 1, wherein the real input device and the emulation input device each comprises a PS/2 communication interface.

5. The switch control system of claim 1, wherein the real input device is a mouse, a keyboard or a combination of both.

6. The switch control system of claim 1, wherein the emulation input device is the emulation of a mouse, a keyboard or a combination of both.

7. A switch control system for a plurality of input devices comprising a real input device and an emulation input device, the switch control system comprising:
    a first switch having a first input directly coupled to the real input device;
    a second switch having a first input directly coupled to an output of the first switch, a second input directly coupled to the emulation input device, an output for directly coupling to a computer, and a control input directly coupled to a control device for transmitting either the real signal or an emulation signal according to a control signal;
    a third switch having a first input for directly coupling to the computer and directly coupled to the emulation input device, and a control input directly coupled to the real input device; and
    a fourth switch having an output directly coupled to the real input device and to a control input of the first switch, a first input directly coupled to an output of the third switch, and a control input directly coupled to the control device.

8. The switch control system of claim 7, wherein a second input of the first switch, a second input of the third switch, and a second input of the fourth switch are coupled to a same predetermined voltage source.